Sept. 4, 1956         H. BRONSTEIN         2,761,946
ELECTRIC HEAT PEN
Filed April 23, 1953
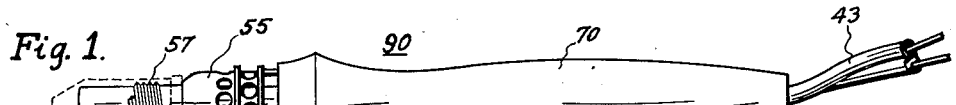
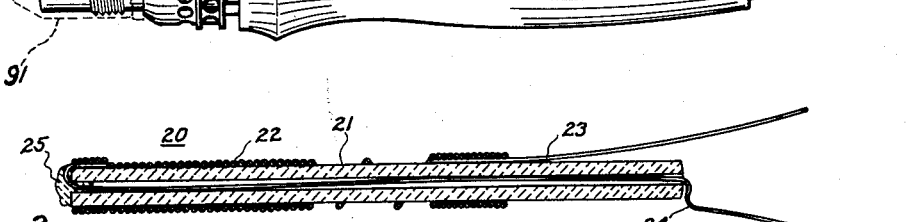
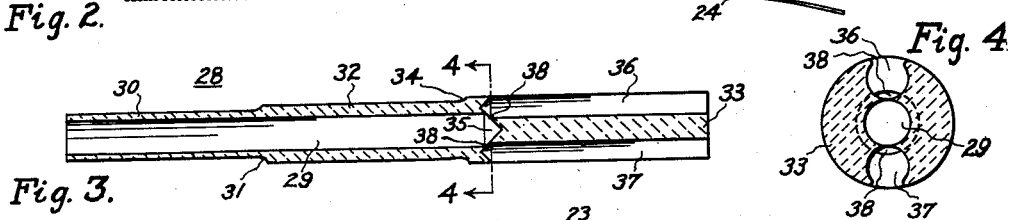
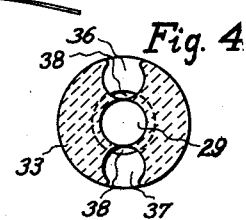
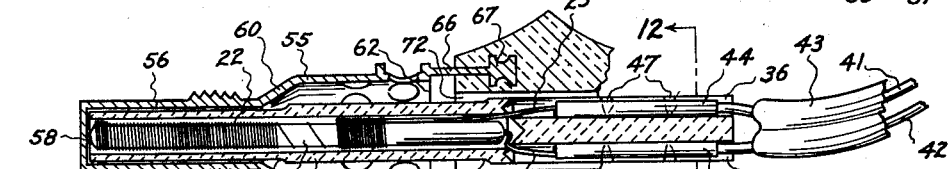
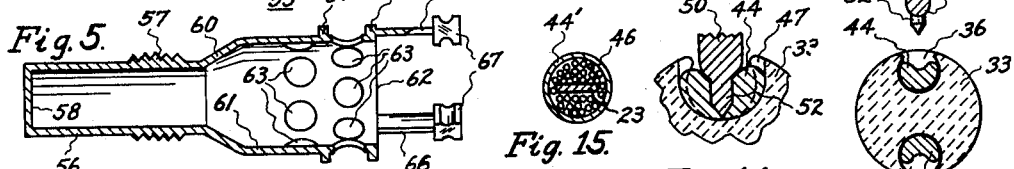
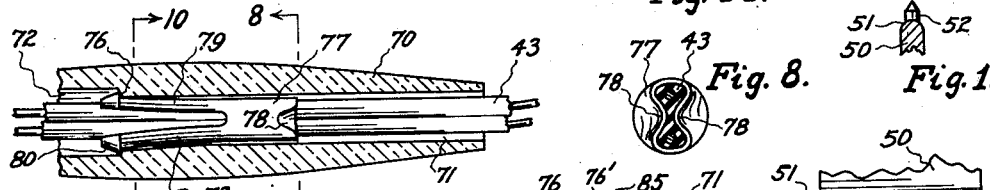
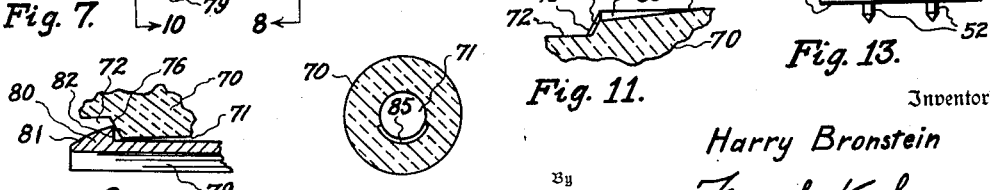
Inventor
Harry Bronstein
By Frank Kahn
Attorney United States Patent Office 2,761,946
Patented Sept. 4, 1956

2,761,946

ELECTRIC HEAT PEN

Harry Bronstein, Philadelphia, Pa.

Application April 23, 1953, Serial No. 350,684

9 Claims. (Cl. 219—29)

This invention relates to hand tools with electrically heated tips, and more particularly, relates to an electric heat pen.

Heretofore, electric soldering irons and other tools with electrically heated tips such as those used for woodburning, foil writing and shaping of wax and plastics and the like, have been inordinately large, heavy and clumsy from the standpoint of lending themselves to the performance of accurate work in crowded quarters or where a fine touch is required. Attempts have been made to reduce the size and weight of such tools to enable them to be conveniently held in the hand and used as a heat pen, but up to now these attempts have fallen far short of complete success. The major difficulty has been to provide adequate heat flow to the working tip while at the same time preventing overheating the fingers of the user. Solution of this problem has been attempted by providing a very thick handle terminating in a large flange or heat shield, or by use of a supplemental thermal barrier of cork, but these have resulted in a tool still too large and clumsy for fine work.

One of the principal objects of my invention is to provide an electric heat pen of small size approximating the conventional fountain pen in size and shape, and of very light weight, and which may be wielded indefinitely without heating discomfort to the user.

Another object of my invention is to provide a hand tool with electrically heated tip having a thermally resistive metallic shell interposed between and rigidly connecting the heated tip and the handle.

A further object of my invention is to provide an electrically heated tool with a readily removable heating element and improved electric cord anchoring means.

With these and other objects in view which will become apparent from the ensuing description and claims, the following sets forth the details of construction and combination of parts of a specific embodiment of the tool of my invention, which I illustrate as an example, and which will best be understood when read in conjunction with the accompanying drawing, in which:

Fig. 1 is a longitudinal view of my heat pen.

Fig. 2 is a greatly enlarged longitudinal sectional view of the heating element of the heat pen of Fig. 1.

Fig. 3 is an enlarged longitudinal sectional view of the ceramic tube which encloses the heating element of Fig. 2.

Fig. 4 is an enlarged sectional view on the line 4—4 of Fig. 3.

Fig. 5 is a longitudinal view partly in section of the metallic shell of my heat pen.

Fig. 6 is a longitudinal sectional view of an assembly of the metallic shell, the ceramic sheath, and the heating element connected to an electric cord.

Fig. 7 is a fragmentary longitudinal sectional view of the rear portion of my heat pen showing details of the cord anchor construction.

Fig. 8 is a sectional view on the line 8—8 of Fig. 7 showing an end view of the cord lock sleeve crimped on the electric cord.

Fig. 9 is a fragmentary enlarged sectional view showing the front end of the cord lock sleeve in locking engagement with an anchoring lip in the handle.

Fig. 10 is a sectional view of the handle on the line 10—10 of Fig. 7 showing the rotation lock groove.

Fig. 11 is a fragmentary enlarged longitudinal sectional view of the handle showing the rotation lock groove.

Fig. 12 is an enlarged sectional view on the line 12—12 of Fig. 6, including fragmentary sectional views of the opposed indenters used to compress the splicing sleeve connecting the heating element conductors to the electric cord.

Fig. 13 is a fragmentary side elevation of one of the pair of indenters shown in Fig. 12.

Fig. 14 is an enlarged fragmentary transverse view through one of the points of the indenter of Fig. 13 illustrating the depth of penetration of the point into the splicing sleeve and expansion of the sleeve into the bore enlargement.

Fig. 15 is an enlarged sectional view of the splice shown in Fig. 6, illustrating the electric cord strands and the heating element ribbon conductor in place in the splicing sleeve, preparatory to making the indentation.

Referring now to Fig. 2 of the drawing, the heating element 20 is a conventional type well known in the art comprised of a porcelain tube 21 carrying a helical winding 22 of resistance heating wire, wrapped over and in electric contact at its respective rear and front ends with flat ribbon conductors 23 and 24 (viewed edgewise in Fig. 2). Conductor 24 is trained over the front end and through tube 21 emerging at the rear end where it is bent downwardly approximately to the circumference of the tube 21 and then rearwardly and downwardly, and conductor 23 is trained rearwardly and somewhat upwardly as it emerges from under the rear end of the winding 22 as illustrated in Fig. 2, for a purpose to be subsequently described. The front end and opening of the tube 21 is plugged with a refractory insulating cement 25 for insulating and additionally securing the conductor 24 in place.

The heating element 20 is inserted into a cylindrical ceramic sheath 28, illustrated in Fig. 3, of steatite or other suitable material, approximately half again as long as the heating element 20 and having a longitudinal bore 29 of slightly larger diameter and slightly longer than said heating element. For approximately the front one-third portion 30 of its length the sheath 28 has a relatively thin wall, after which the external diameter is enlarged to about double the wall thickness over the intermediate one-third portion 32 of the sheath length, the transition to the enlarged diameter having a concave curvature or fillet 31 to prevent stress concentration. The rearward portion 33 of the sheath is similarly enlarged in diameter over that of the portion 32, the transition 34 between these portions being also filleted and disposed a short distance forwardly of the conical end 35 of the bore 29. The rear portion 33 has two similar diametrically disposed longitudinal bores 36 and 37 of diameter approximately one-third that of the portion 33 and respectively tangent to the surface thereof, both bores extending forwardly until their conical front ends just overlap the end 35 of the bore 29 so that each communicates therewith at the opening 38 as shown in Fig. 4. During the course of casting the bores 36 and 37, the thin outward edges are eliminated to provide longitudinal access slots to these bores, the width of the slots being thus slightly less than the diameter of the bores.

The heating element 20 is assembled to the sheath 28 by suitably springing the ends of the conductors 23 and 24 toward each other and inserting it, conductors first, completely into the bore 29 in proper relative position thereto so that the conductors 23 and 24 enter the bores 36 and 37 through the respective openings 38. This is accomplished with facility owing to the radially outward biasing of these conductors, as previously described, and in particular the shape of the conductor 24 engaging the conical end 35 of the bore 29 assures against possibility of short-circuiting of this conductor with the conductor 23.

In the bores 36 and 37, the conductors 23 and 24 are respectively spliced to the conductors 41 and 42 of the electric cord 43 supplying energy to the heat pen from a source of electric energy (not illustrated), by means of compressed splicing sleeves 44 and 45. In making these splices, for example splicing the ribbon conductor 23 to the stranded cord conductor 41, the end of the latter is stripped of insulation and inserted into a cylindrical splicing sleeve 44' until the strands protrude slightly beyond its other end. The sleeve 44' which is of a size to push fit into the bore 36, is then inserted into the bore from the rear until approximately centered therein. During this movement and facilitated by access through the access slot in the outer wall of the bore 36, the end of the ribbon conductor 23 is fed into the approximate middle of the protruding strands 46 so that when in final position it lies centrally of the sleeve as illustrated in Fig. 15. The access slot of bore 36 is narrower than the sleeve 44' so that the latter will remain in place during subsequent handling and indentation. The splice of conductors 24 and 42 in bore 37 is similarly prepared with an identical splicing sleeve.

Compression indentation of the splicing sleeves is accomplished by means of a pair of opposed dies or indenters 50, which comprise the opposing jaws of a conventional gripping tool such as a pair of pliers or forceps (not illustrated). The indenters 50 are illustrated in Fig. 12 just subsequent to retraction from the access slots in the bores 36 and 37 after having indented the sleeves 44 and 45. Each of the indenters 50, as illustrated in Figs. 12 to 14, comprises a semicylindrical indenting surface 51 supplemented by two longitudinally spaced transverse protruding points 52. During indentation, the splicing sleeves and the conductors encircled therein are collapsed and deformed by the surface 51 into a permanently compact dense metallic mass of good electrical conductivity, having a longitudinal generally semicylindrical radially outward groove. The indenting points 52 are cylindrical with a conical tip and are of such length as to penetrate almost completely through the splices to produce an indentation of complementary shape. At the two locations along the bores 36 and 37, at which the points 52 of the indenter 50 are applied to the sleeve 44, the bore 36 has transverse cylindrical enlargements radial of the sheath 28 to permit expansion therein of the sleeve for the purpose of locking the sleeve securely in the bore and providing high strength to the splice. Fig. 14 illustrates the expansion of the sleeve 44 into the bore enlargement 47 by action of the point 52. The sleeves 44 and 45 may be of any suitable length but I have found a length as small as ½ inch to be adequate for a completely satisfactory splice. These splices are rapidly, conveniently and economically fabricated and occupy a practical minimum of space.

The metal shell 55, illustrated in Fig. 5, is preferably composed of thin high-strength stainless metal of low thermal conductivity, such as #309 steel or the equivalent. The shell comprises a hollow cylindrical stem 56 having external threads 57 over a portion spaced from the front end and a transverse flat wall 58 closing that end. Slightly rearwardly of the threads 57 the shell is enlarged radially by a short rearwardly expanding 60-degree cone portion 60. Rearwardly of the portion 60, the shell continues as a hollow cylinder 61 to its rearward edge 62. A short distance rearwardly of the conical portion 60, the cylinder 61 is ringed with a band 63 of closely-spaced circular or oval perforations, then by an external annular stiffening ridge 64, then by another ring of perforations 63 and finally by another external annular stiffening ridge 65 similar to the ridge 64, at the edge 62. Extending longitudinally rearward from the ridge 65 are three symmetrically disposed thin peripherally curved tangs 66 each terminating in a key 67. When the sheath 28 containing the heating element 20 is inserted full depth into the shell 55 as illustrated in Fig. 6, the stem 56 is coextensive with the active portion of the heater winding 22, the fillet 31 of the sheath is disposed just rearwardly of the shell enlargement 60, and the fillet 34 is disposed approximately in the region of the tang key 67.

The handle 70 is cast of tough plastic of suitable external shape to fit the hand conveniently when held as one would hold a pen, and is provided with a cylindrical axial opening having a rear portion 71 sized to receive readily the heating element and sheath assembly and a slightly enlarged front portion 72. The rearward portions of the shell tangs 66 including the keys 67 are cast into the fore part of the handle 70 with the handle spaced from the shell end 62 and with the shell and handle axially aligned, so that the sheath 28 may be inserted until it contacts the front wall 58 of the shell.

The opening portion 71 which is cast in the handle 70, is somewhat less than half the length of the handle and expands into the larger opening 72 by way of an annulus of a cone constituting an anchoring lip 76, shown in Figs. 7 and 10. A gripping sleeve 77, of resilient metal, has a cylindrical rearward portion tightly crimped to the cord 43 by opposing deep diametral indentations 78 formed in the sleeve adjacent its rearward edge and normal to a diameter passing through both cord conductors, as illustrated in Fig. 9. The forward portion of the sleeve 77 is bifurcated paralleling the diameter joining the indentations 78 to form spring members 79 in quadrature with said indentations, said members being biased outwardly and each provided at its front end with an outwardly extending peripheral hook 80. The front surfaces 81 of the hooks 80 slope gradually forwardly inward to permit the sleeve 77 to be readily pushed forwardly in the opening 71. The rear surfaces 82 of the hooks 80 are normal to the axis to prevent unintentional removal of the cord from the handle 70 after engagement of the hooks with the lip 76.

The sleeve 77 is attached to the cord 43 in such position that the hook surfaces 82 are slightly rearward of the lip 76 when the heater element, sheath and cord assembly are pushed just all the way into the shell and handle assembly. A moderate degree of additional forward pressure is then applied on the outer end of the cord to force the hooks 80 into anchoring engagement with the lip 76, with the portions of the cord forward of the anchor under slight compression. This compression is shock resistant and is effective to prevent rattling or other undesirable movement of the forward components of the heat pen.

Although the above described compression is usually adequate to prevent rotation within the handle of the sheath and cord assembly upon twisting of the external part of the cord, this relative rotation is completely prevented in my heat pen by inclusion of a rotation stop. This stop comprises a shallow longitudinal groove 85 in the wall of the opening 71 extending from the annulus 76 rearwardly for a short distance and tapering rearwardly to merge with the wall of the opening 71, the annulus 76 being cut back slightly as at 76' over the width of the groove, as shown in Fig. 11. The peripheral width of the groove 85 is slightly greater than the width of one of the members 78. When the assembly is inserted in the handle 70, one or the other of the members 78 will engage the groove 85 and the cut-back 76' to lock the sleeve 77 against rotation.

Although I have illustrated the sleeve 77 as being bifurcated, it is obvious that the front part of the sleeve may be split into a greater plurality of members similar to members 78, and the groove 85 may be correspondingly reduced in width.

When it is desired to remove the heating element, sheath and cord assembly, it is only necessary to hold the handle 70 with one hand and jerk or pull the cord relatively hard with the other hand. This action will cause the rear hook surfaces 82 to be cammed inwardly by the sloping lips 76 and 76' to release their anchoring engagement and thereafter permit ready withdrawal of the assembly. However, ordinary handling of the heat pen including moderate jerking of the cord will be insufficient to release the anchoring engagement.

With the heat pen 90 completely assembled as illustrated in Fig. 1, an appropriate tip such as the soldering iron tip 91, shown in broken lines, provided with suitable female threads, is screwed on the threads 57 of the shell 55. It is to be understood, however, that any other desired type of heated tip such as a wax-shaping spatula, or wood-burning or foil-writing tool may be equally well used with my heat pen.

One of the most important features of the heat pen is the construction of the shell 55. The metal is required to be of relatively low thermal conductance and also adequately strong for shell thicknesses of less than 10 mils and for peripheral spacings of the order of 20 mils between adjacent perforations. The heat flow is accordingly choked by the narrow passage between the perforations, the stiffening ridges act additionally as heat radiators, and the heat which finally reaches the terminal ridge 65 has only three narrow metallic paths along the tangs 66 to the handle 70.

A pen constructed as herein described, approximately six inches long, with a power input of 20 watts, had a total weight with soldering tip and including cord and plug of approximately three ounces and was found to be operable indefinitely in usual room ambient temperatures without becoming uncomfortably warm to handle.

Although I have described my invention as exemplified in a heat pen, it is obvious that its principles may be equally well applied to reduce the size, weight, and power input for equivalent performance of larger heated-tip tools. My 20-watt heat pen performs comparably with a 95-watt conventional soldering iron of good quality both as to heat transfer to the work, and temperature recovery rate. On the same basis, a 75-watt soldering iron constructed in accordance with my invention would be equivalent to a conventional soldering iron of approximately 350 watts input.

Although the invention has been described in considerable detail, such description is intended as illustrative rather than limiting, as other embodiments as well as obvious modifications in construction and arrangement will be evident to those skilled in the art, without departing from the spirit of my invention.

I claim:

1. In a tool having a rearward handle and a heated working tip, heating means for said tip, a thin cylindrical perforated metallic shell interposed between said handle and said tip for rigidly connecting them and for controlling heat transfer from said heating means to said handle, said shell having its rear end fixed to said handle and its forward end provided with an integral stem extending into and detachaby engeabe with said tip, said shell being of much larger diameter than said stem and having a steeply tapered conical connection therewith disposed immediately rearwardly thereof to provide adequate mechanical strength, increased convection space and reduced longitudinal thermal conductance, said handle having a through axial aperture, said heating means comprising a cylindrical electric heating element within a coextensive axial opening in a cylindrical ceramic sheath, said sheath extending from a point well within the handle aperture to within the end of said stem, the portion of said sheath within said stem having a relatively thin wall whereby to provide low thermal resistance to transfer of heat from said heating element to said stem, the portion of said sheath between said stem and just within the handle entrance having a wall thickness substantially greater than the wall thickness within the stem to provide adequate structural strength while permitting effective radial dissipation of heat.

2. In a tool having a handle and a heated working tip, heating means for said tip, a thin cylindrical metallic shell interposed between said handle and said tip for rigidly connecting them and for controlling heat transfer from said heating means to said handle, said shell being fixed to said handle and extending into and detachably engageable with said tip and including a region externally of said tip of greatly enlarged diameter having low longitudinal thermal conductance said handle having a through axial aperture, said heating means comprising a cylindrical electric heating element within a coextensive axial opening in a cylindrical ceramic sheath, said sheath extending from a point well within the handle aperture to within the end of the shell which extends into said tip and being slightly enlarged in diameter after emergence from said end of said shell and again slightly enlarged in diameter after entrance within said handle, the portion of said sheath within said handle being provided with two diametrically disposed longitudinal bores tangent to the surface of said sheath and extending from the larger end thereof to just overlap the axial opening therein and respectively communicating therewith, said heating element having two leads each passing into one of said tangential bores through the respective communication with said axial opening, and said tool having a two-conductor electric supply cord entering the handle aperture from the end opposite to the tip, each of the ends of the conductors of said cord being respectively disposed in one of said tangential bores and spliced therein to the respective heating element lead.

3. The invention set forth in claim 2 characterized in that said tangential bores have longitudinal access slots where they meet the sheath periphery, that each heating element lead is spliced to the associated cord conductor with a cylindrical metallic splicing sleeve sized to push fit into the bore, the conductor and lead entering the sleeve from opposite ends thereof and overlapping therein, and that said sleeve and the conductor and lead therein are longitudinally indented by an indenting tool entering the bore by way of the access slot.

4. The invention set forth in claim 3 characterized in that said tangential bores are each provided with at least one cylindrical enlargement radial of the sheath and that the indenting tools have complementary indenting points, whereby the sleeves and encircled contents are laterally expanded in these enlargements to lock the sleeves in the bores and to provide high strength to the splices.

5. In a tool having a rearward handle and a heated working tip, heating means for said tip, and means interposed between said handle and said tip for rigidly connecting them and for controlling heat transfer from said heating means to said handle, said second-named means comprising a thin metallic shell fixed to said handle and having an integral forward end extending into and detachably engageable with said tip, the portion of said shell rearwardly of said tip being of generally cylindrical shape and of much larger diameter than said forward end and having a steeply tapered conical connection therewith, said rearward portion having a plurality of adjacent circumferential bands of closely spaced perforations, and adjacent one of said bands said shell over a short axial length having a thickness substantially greater than the thickness of the adjacent portion of the shell whereby to provide reinforcement.

6. The invention set forth in claim 5 characterized in that at the end toward the handle said shell is provided with a plurality of radially thin longitudinally extending relatively narrow coextensive integral tangs having their ends fixed in said handle and spacing said shell a substantial distance therefrom to provide an air convection space between said handle and said shell free of solids other than said tangs, whereby the portions of said tangs not fixed in said handle have capacity for unimpeded thermal exchange with the air traversing said space.

7. In a tool having a rearward handle and a heated working tip, a retractable electric heating element assembly extending into said tip, means interposed between said handle and said tip for rigidly connecting them and for controlling heat transfer from the heating element to said handle, said handle having a through axial aperture including an annularly enlarged portion whose rearward boundary constitutes a lip, said assembly including an electric supply cord disposed in said aperture, said cord having an anchoring sleeve crimped thereon, said sleeve having a plurality of outwardly biased integral spring members each terminating in an outwardly extending hook having a rearward surface substantially normal to the handle axis, said assembly having capacity for being inserted into said aperture from the rear of said handle and moved forwardly until it extends into said tip, and said hooks being disposed longitudinally of said assembly so that they readily engage said lip when said assembly has been inserted into the aperture in said handle from the rear and has been advanced to proper position in said tip.

8. The invention set forth in claim 7 characterized in that said hooks and said lip are constructed and arranged to resist disengagement on application of force up to a predetermined value applied in a direction away from said tip, but to disengage and permit withdrawal of the cord and associated heating element when the applied force exceeds said value.

9. In a tool having a handle and a heated working tip, heating means for said tip, a thin cylindrical metallic shell interposed between said handle and said tip for rigidly connecting them and for controlling heat transfer from said heating means to said handle, said shell being fixed to said handle and extending into and detachably engageable with said tip, said handle having a through axial aperture, said heating means comprising a cylindrical electric heating element within a coextensive axial opening in a cylindrical ceramic sheath, said sheath extending from a point well within the handle aperture to within the end of the shell which extends into said tip, the portion of said sheath within said handle being provided with two longitudinal grooves communicating with said axial opening, said heating element having two leads each respectively passing into one of said grooves through the respective communication with said axial opening, and said tool having a two-conductor electric supply cord entering the handle aperture from the end opposite the tip, each of the ends of the conductors of said cord being respectively disposed in one of said grooves and spliced therein to the respective heating element lead.

References Cited in the file of this patent

UNITED STATES PATENTS

| | | |
|---|---|---|
| 878,952 | Hertzberg et al. | Feb. 11, 1908 |
| 1,075,473 | Hadaway | Oct. 14, 1913 |
| 1,130,218 | Trood | Mar. 2, 1915 |
| 1,491,389 | Frykman | Apr. 22, 1924 |
| 1,612,220 | Ravella | Dec. 28, 1926 |
| 1,909,061 | Lindholm | May 16, 1933 |
| 1,988,827 | Bennett | Jan. 22, 1935 |
| 2,031,532 | Goldman | Feb. 18, 1936 |
| 2,213,438 | Young | Sept. 3, 1940 |
| 2,224,583 | Abbott | Dec. 10, 1940 |
| 2,257,376 | Grey | Sept. 30, 1941 |
| 2,274,408 | Hampton et al. | Feb. 24, 1942 |
| 2,346,327 | Pfeiffer | Apr. 11, 1944 |
| 2,452,259 | Pabis | Oct. 26, 1948 |
| 2,497,146 | Warren | Feb. 14, 1950 |